United States Patent [19]
Shaiman et al.

[11] Patent Number: 5,706,450
[45] Date of Patent: Jan. 6, 1998

[54] METHOD AND SYSTEM FOR PRESENTING ALTERNATIVES FOR SELECTION USING ADAPTIVE LEARNING

[75] Inventors: Steven Allen Shaiman; Raleigh Miles Roark, both of Seattle, Wash.

[73] Assignee: Microsoft Corporation, Redmond, Wash.

[21] Appl. No.: 641,089

[22] Filed: Apr. 29, 1996

Related U.S. Application Data

[62] Division of Ser. No. 171,540, Dec. 22, 1993, abandoned.

[51] Int. Cl.⁶ .................................................. G06F 3/14
[52] U.S. Cl. .................................................. 395/326
[58] Field of Search .............................. 395/326, 327, 395/328, 329, 330, 331, 332, 333, 334

[56] References Cited

U.S. PATENT DOCUMENTS

| | | | |
|---|---|---|---|
| 4,655,621 | 4/1987 | Holden | 400/100 |
| 5,125,071 | 6/1992 | Ozeki | 395/100 |
| 5,197,810 | 3/1993 | Zhang et al. | 400/110 |
| 5,387,042 | 2/1995 | Brown | 400/109 |

FOREIGN PATENT DOCUMENTS 0268262  5/1988  European Pat. Off. .......... G06F 3/00

*Primary Examiner*—Thomas G. Black
*Assistant Examiner*—Ruay Lian Ho
*Attorney, Agent, or Firm*—Jones & Askew, LLP

[57] ABSTRACT

A method and system for efficiently presenting a series of alternatives for a user's selection using adaptive learning is provided. In a preferred embodiment, a software facility receives a request to select an item from an identified group of alternatives. The facility presents items from the group of alternatives identified by the request in decreasing order of their likelihood of selection. The facility subsequently receives an indication of the alternative to select, and proceeds to select that alternative. In a further preferred embodiment, the items each correspond to a set of one or more characters that cannot be generated using an available keyboard, and, when the user uses the facility to select an item, the facility inputs the corresponding set of characters.

19 Claims, 12 Drawing Sheets

METHOD AND SYSTEM FOR PRESENTING ALTERNATIVES FOR SELECTION USING ADAPTIVE LEARNING

CROSS-REFERENCE TO RELATED APPLICATION

This application is a continuation of U.S. patent application No. 08/171,540, filed Dec. 22, 1993, now abandoned.

TECHNICAL FIELD

The invention relates generally to a method and system for presenting alternatives for selection, and, more specifically, to a method and system for presenting alternatives for selection using adaptive learning techniques.

BACKGROUND OF THE INVENTION

In many computer systems, a human user uses a keyboard to input characters that may be displayed or stored. At the advent of such computer systems, there was typically a close correspondence between the set of characters that a computer system's keyboard could generate and the set of characters that the computer system could display and store.

In modern computer systems, users are permitted to display and store many more characters than can be generated by a single keyboard. A typical keyboard can generate on the order of 94 characters. Modern computers permit users to display and store many more than 94 characters. Most computers now permit users to display and store characters using character sets having up to 255 different characters. Further, the Unicode standard permits character sets having as many as 65,000 characters.

Accordingly, some computer systems have mechanisms to input characters that cannot be generated by a single keyboard. In some computer systems, a user may input a character that cannot be generated by a keyboard by using the keyboard to enter a numeric character code corresponding to the character. For example, to input the a-accent-aigu character ("à"), a user might have to type a control key to enter character code mode, then the code for the a-accent-aigu character, "0224". FIG. 1 is a screen image illustrating the state of the screen when a user types the code for a character that cannot be generated by a keyboard. The screen image shows a program window 100 generated by a program for inputting, displaying, and storing characters. Overlaying the program window 100 is a character code input window 101. The character code input window 101 contains the code for the a-accent-aigu character 102, typed by the user. One difficulty with this mechanism is that it requires the user to issue an instruction to enter character code mode, and to refer to or memorize a chart of character codes. Oftentimes such requirements are cumbersome to a user.

In other computer systems, a user may input a character that cannot be generated by a keyboard through the use of a pointing device, such as a mouse. The pointing device is used to select a character from a character set displayed on a video display. FIG. 2 is a screen image for an instance wherein a user is selecting a character from a displayed character set. The screen image shows a program window 200 generated by a program for inputting, displaying, and storing characters. Overlaying the program window is a character set display window 201, which contains a visual representation of a character set 203. A character selection box 202 shows that the user is selecting the a-accent-aigu character. To input the a-accent-aigu character, a user might have to use a control key or menu selection to display a character selection chart, then locate and use a pointing device to select the a-accent-aigu character. The primary drawbacks of this approach are that it is time-consuming and prone to error. Specifically, a user must first issue an instruction to display the character selection chart, and then to locate the desired character among hundreds of characters. Both of these tasks are time-consuming and prone to user error.

Both of these mechanisms have significant drawbacks. Neither provides an intuitive and efficient way for a user to select a character for input that cannot be generated by the keyboard being used. An analogous problem exists in every case in which a computer system must present a series of alternatives for a user's selection.

SUMMARY OF THE INVENTION

It is an object of the invention to provide a method and system in a computer system for presenting items from a group of alternatives for efficient selection.

It is another object of the invention to provide a method and system in a computer system for selecting one or more target characters for input.

It is a further object of the invention to provide a method and system in a computer system having a keyboard for facilitating the input of characters that cannot be generated using the keyboard.

These and other objects, which will become apparent as the invention is more fully described below, are provided by a method and system for efficiently presenting a series of alternatives for a user's selection using adaptive learning. In a preferred embodiment, a software facility receives a request to select an item from an identified group of alternatives. The facility presents items from the group of alternatives identified by the request in decreasing order of their likelihood of selection. The facility subsequently receives an indication of the alternative to select, and proceeds to select that alternative. In a further preferred embodiment, the items each correspond to a set of one or more characters that cannot be generated using an available keyboard, and, when the user uses the facility to select an item, the facility inputs the corresponding set of characters.

DETAILED DESCRIPTION OF THE INVENTION

Figure 1:
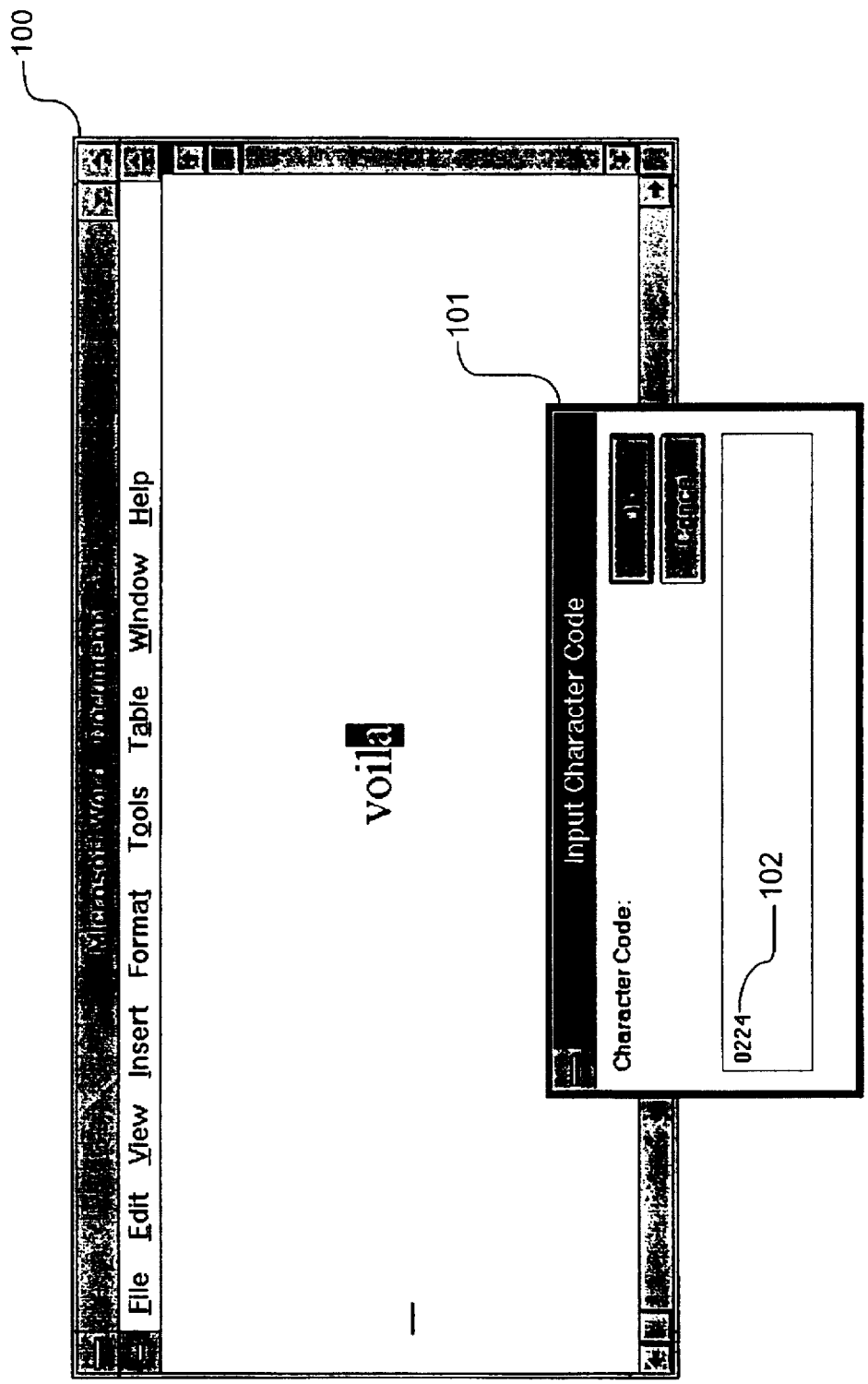
FIG. 1 is a screen image illustrating the state of the screen when a user types the code for a character that cannot be generated by a keyboard.
Figure 2:
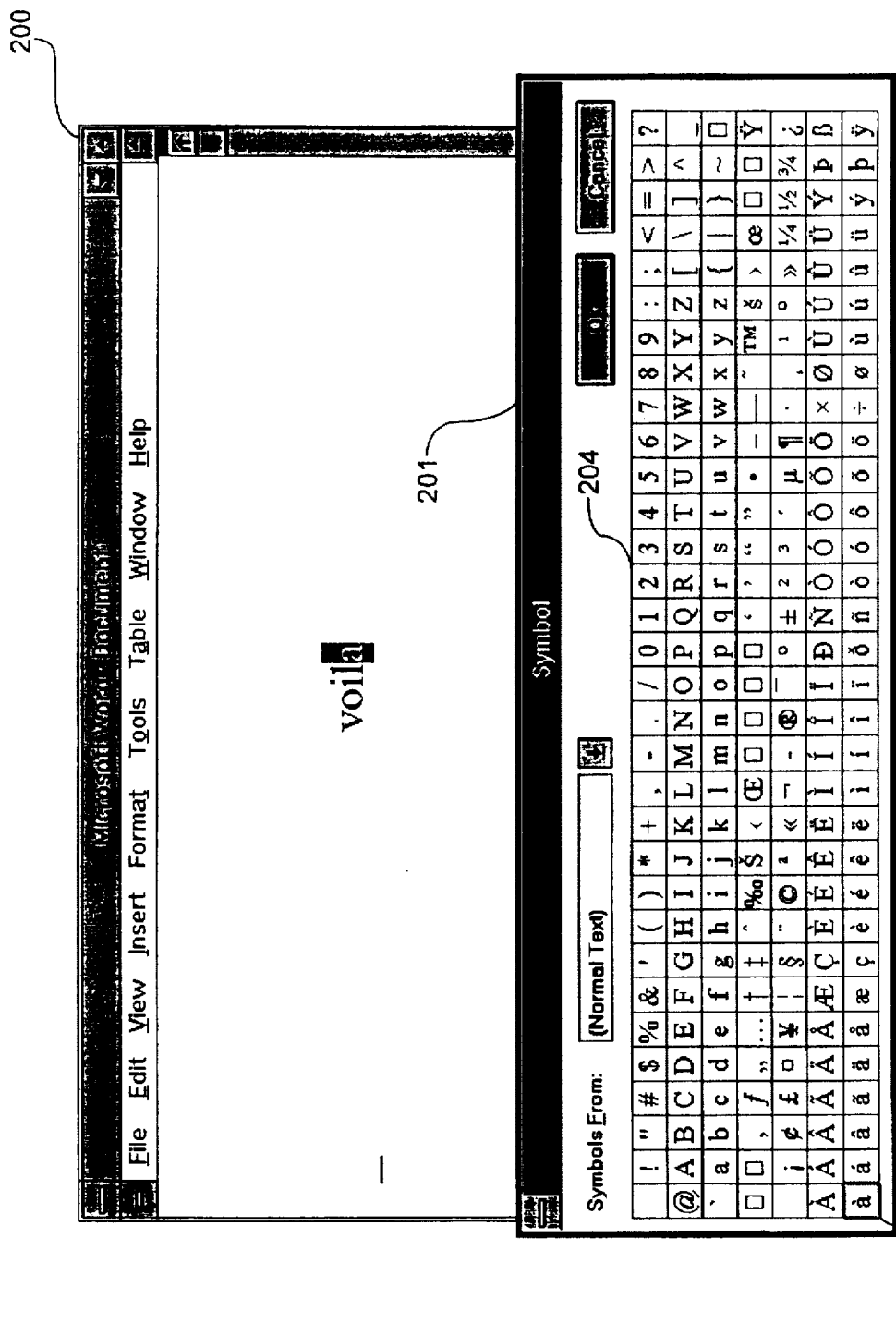
FIG. 2 is a screen image for an instance wherein a user is selecting a character from a displayed character set.

The preferred embodiment of the present invention provides a method and system for efficiently presenting a series of alternatives for a user's selection using adaptive learning. The preferred embodiment of the invention presents a series of alternatives for a user's selection in the order of their anticipated likelihood of selection based upon previous selections from among the alternatives. The preferred embodiment described herein operates quickly and occupies relatively little memory.

In a preferred embodiment, a software facility (the facility), comprising steps carried out by a computer system, inputs characters that cannot be generated by a keyboard. In a preferred embodiment, the facility is a program written in the macro language of an application program, such as a word processing program. A user uses the facility to input a character that cannot be generated by a keyboard (target character) by first typing a key on the keyboard to input a character related by an intuitive theme to the target character, then repeatedly invoking a replace function to replace the typed character with each character in turn of a group of characters related to the typed character (character group, or simply group) until the desired character is selected. For example, to input an a-accent-aigu character, the user inputs an a character by typing the a key on the keyboard, then selects the a-accent-aigu character by repeatedly invoking a replace function to replace the a character with characters related to the a character until the replace function replaces the a character with an a-accent-aigu character. The facility automatically reorders the groups to present related characters in decreasing order of their anticipated likelihood of selection after a selection is made so that the next time the replace function is invoked, the new order is used. A user may also reorder the groups, change the characters included in each group, add groups, and delete groups.

Table 1 below presents a few sample groups. For each group, the group theme and group members are listed.

TABLE 1

| theme | group |
| --- | --- |
| lower case letters | a, ä, à, á, â, ã, å, æ |
| upper case letters | E, È, É, Ê, Ë |
| currency symbols | $, ¢, £, ¥, ₩ |
| grouping characters | (, ), {, }, [, ], «, » |
| fractions | /, ¼, ½, ¾ |
| quotes | ", ", ", ', ' |

Each theme is one way of associating characters that cannot be generated using the keyboard with one or more "key characters" that may be generated using the keyboard. For example, the lower case letters theme can be used to associate foreign language characters that appear to contain the a character with the key character the a character, which may be generated by the keyboard. As another example, the currency symbols theme can be used to associate foreign currency symbols that cannot be generated using the keyboard with the key character (the dollar sign) character ("$"). Besides replacing key characters that appear on the keyboard, the facility can also replace key characters that have been inserted in the document by some other method. For example, the facility is able to replace characters inserted in the document using the above-discussed prior art methods of inputting a numerical character code or using a pointing device to select a character from a display character set, as well as characters earlier entered using the facility.

Figure 3:
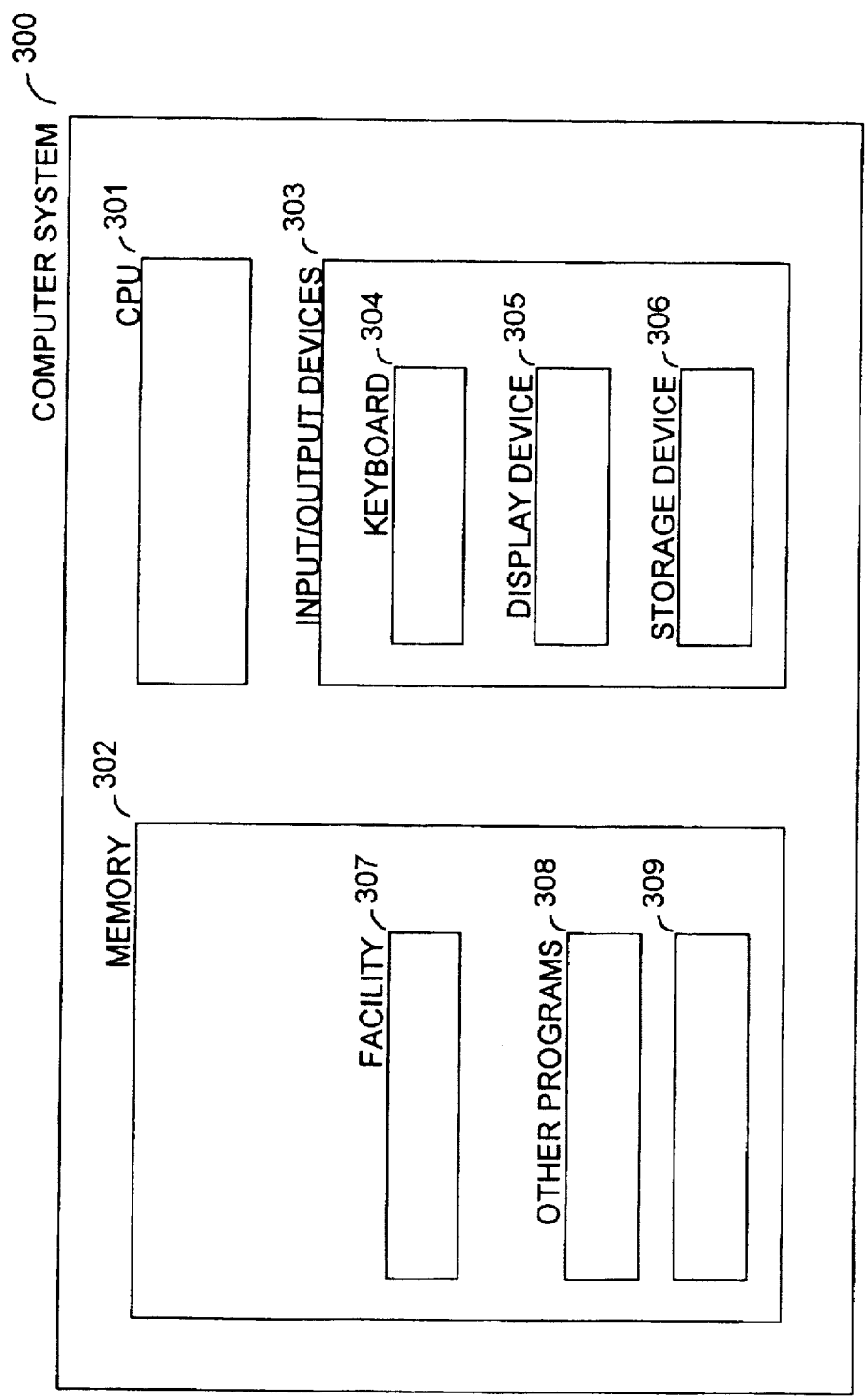
FIG. 3 is a high-level block diagram of the general-purpose computer system upon which the facility preferably operates.

FIG. 3 is a high-level block diagram of the general-purpose computer system upon which the facility preferably operates. The computer system 300 contains a central processing unit (CPU) 301, a computer memory (memory) 302, and input/output devices 303. Among the input/output devices are a keyboard 304, a display device 305, such as a monitor, and storage device 306, such as a hard disk drive. By pressing one or a combination of keys, the user is able to use the keyboard 304 to generate a character that is input into the computer system. The memory contains the program for the facility 307 and other programs 308–309 for inputting, displaying, and storing characters. Character groups like those shown in Table 1 are preferably stored in memory as arrays of characters, also called strings. In some circumstances it is preferable to store each group in a separate string. In some other circumstances, however, it is more convenient to store all the groups in the same string. In either case, each group is preferably stored by first storing the key character, then storing the characters of the group in decreasing anticipated likelihood of selection. The key character is also preferably stored at the end of the group, so that the user may select the key character if the user does not wish to select any of the other characters in the group. Storing the key character at the end of the group also has the advantage that the user may loop through the group repeatedly if desired. All of the programs preferably execute on the CPU. In an alternate preferred embodiment, the computer system shown in FIG. 3 is part of a distributed processing system, in which multiple computer systems that are connected by communication links work together to execute programs, executing each of a number of different parts of a single program on the CPUs of different computer systems.

Figure 4:
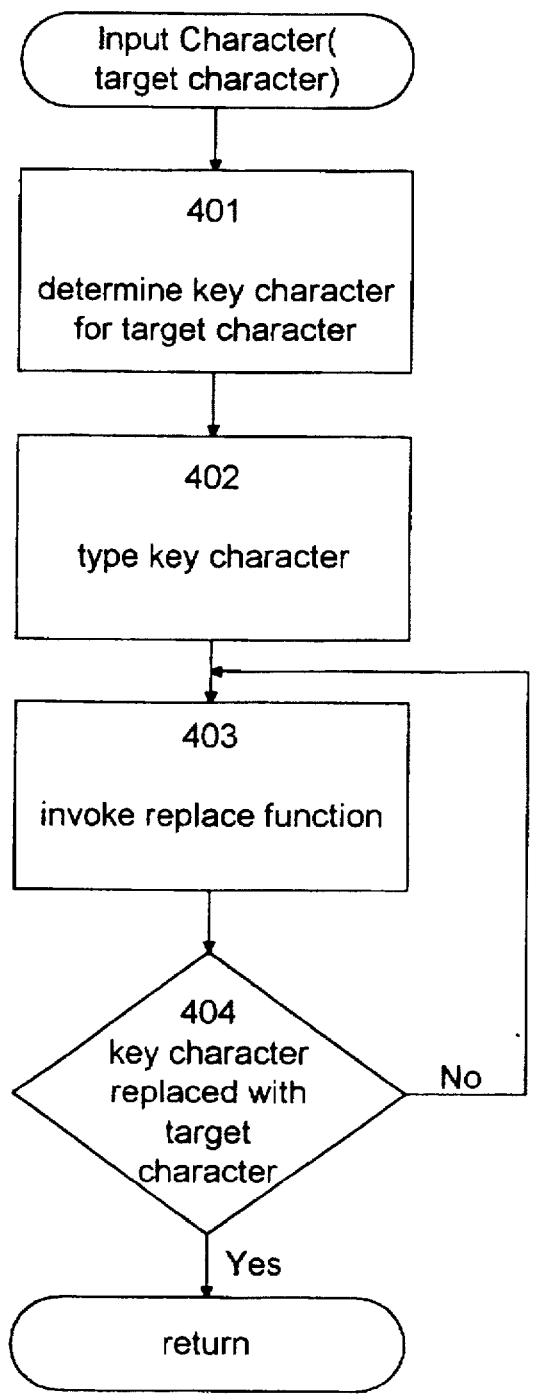
FIG. 4 is a flow diagram showing the steps required to use the facility to input a target character.

FIG. 4 is a flow diagram showing the steps required to use the facility to input a target character. While the steps shown in the other flow diagram figures are preferably executed by the facility, these steps shown in FIG. 4 are preferably carried out by a human user. In step 401, the user determines the key character that corresponds to the target character. In most cases, this involves identifying the theme most likely to encompass the target character, then determine the key character for the correct group having that theme. As an example, suppose the target character was the a-accent-aigu character. Because the a-accent-aigu character looks something like the a character, it is likely to be in a group having the theme lowercase letters and for which the key character is the a character. In step 402, the user types the key character, in this case the a character.

Figure 5:
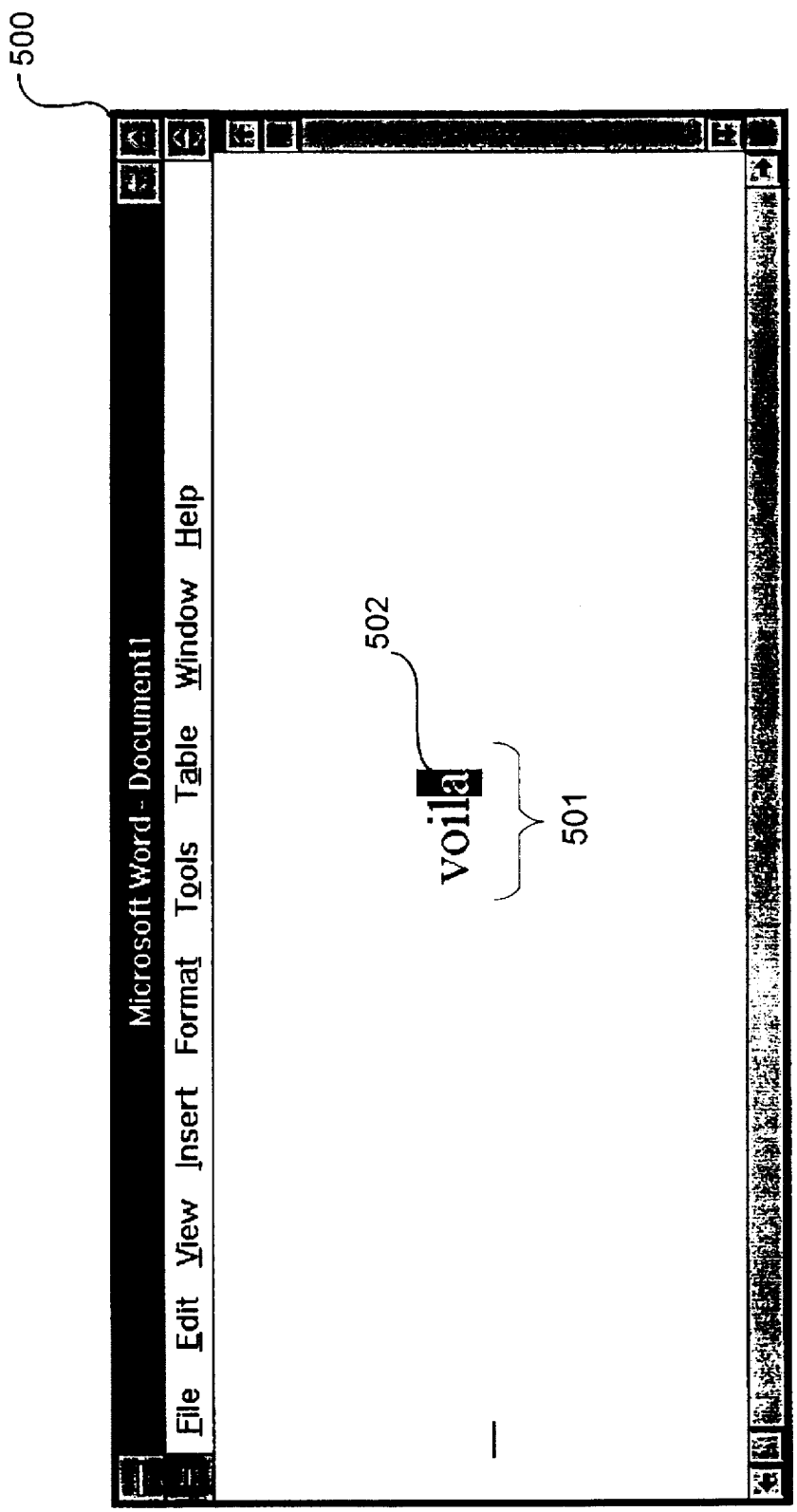
FIG. 5 is a screen image showing the user carrying out step 402.

FIG. 5 is a screen image showing the user carrying out step 402. The screen image shows a program window 500 generated by a program for inputting, displaying, and storing characters. The program window 500 containing text 501. As part of the text 501, the user has already entered the a character 502. In step 403, the user invokes the Replace function. Briefly, the Replace function replaces the key character with the next character in the key group. The user preferably invokes the Replace function by typing a command key combination on the keyboard that is received by a program that is able to execute the facility. The Replace function is described in more detail below.

Figure 6:
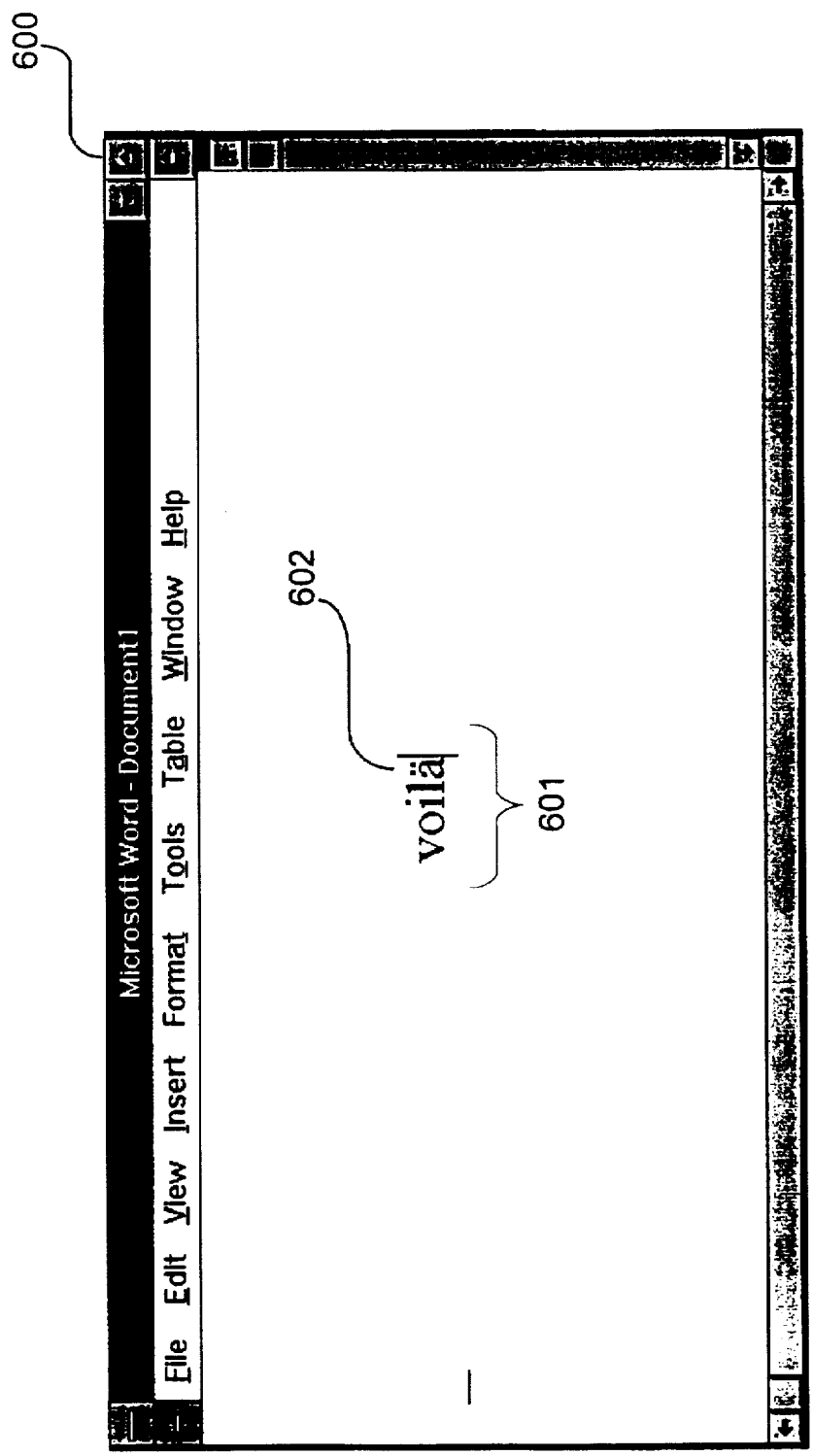
FIG. 6 is a screen image showing the replacement of the key character with the first character in the key character's group.

FIG. 6 is a screen image showing the replacement of the key character with the first character in the key character's group. The screen image shows a program window 600 containing text 601. The Replace function has replaced the last letter of the text 601 with an a-umlaut character ("ä") 602. In step 404, if the replace function replaced the key character with the target character, then these steps conclude, else the user continues its step 403 to invoke the replace function again. Since the key character a was replaced with an a-umlaut character and not the target character a-accent-aigu, the user continues at step 403. In step 403, the user invokes the replace function again.

Figure 7:
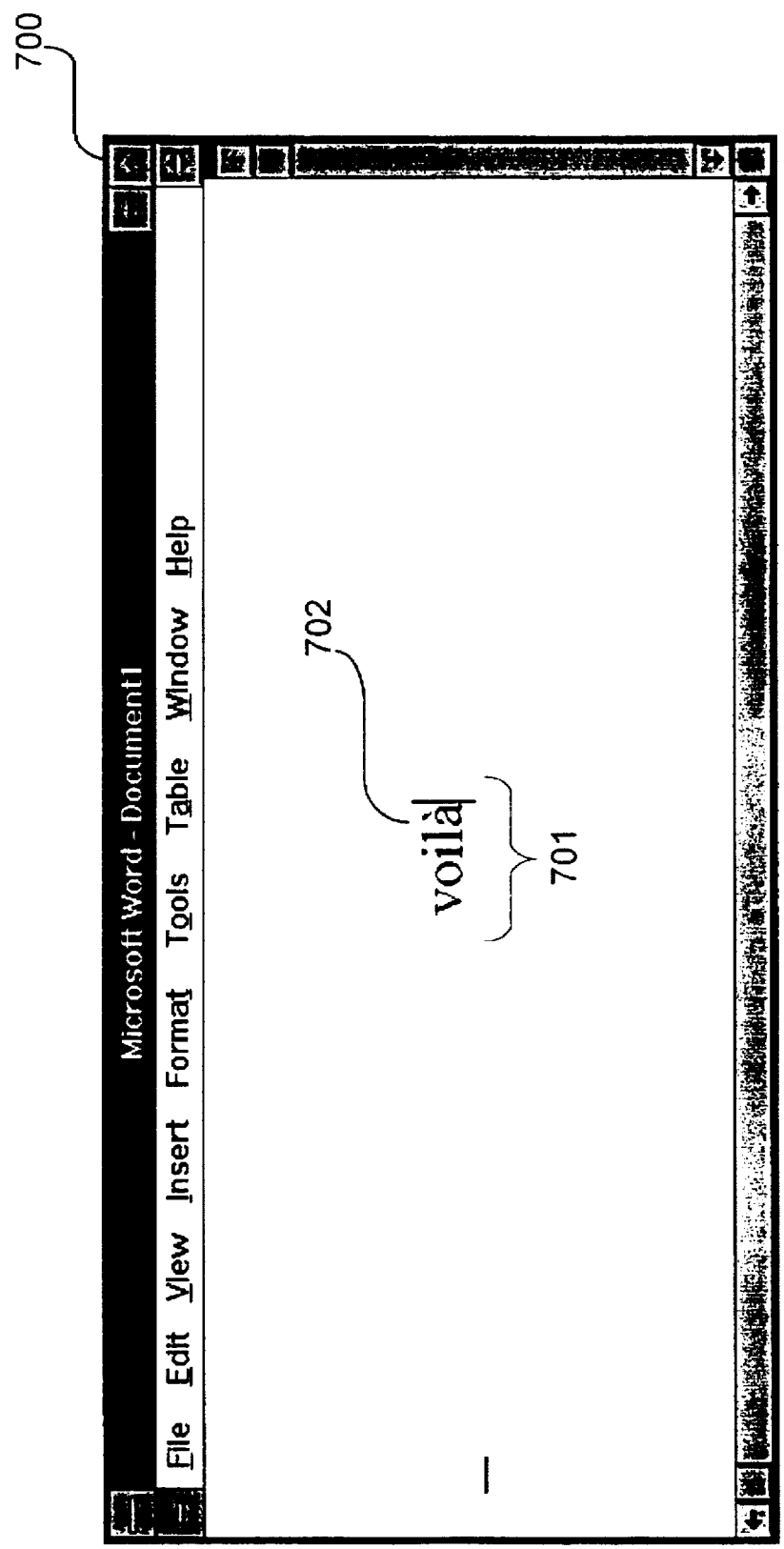
FIG. 7 is a screen image showing the replacement of the key character with the second character in the key character's group.

FIG. 7 is a screen image showing the replacement of the key character with the second character following the key character in the key character's group. The screen image shows a program window 700 containing text 701. The Replace function has replaced the last character of the text 701 with the next character in the group, the a-accent-aigu character 702. In step 404, because the key character has been replaced with the target character, these steps conclude.

After the user has used the facility to input the a-accent-aigu character, the facility updates the order of the group that contains the a-accent-aigu character. This involves determining whether the selection of the a-accent-aigu character changes the order of anticipated likelihood of selection of the characters within the group for the future, and, if so, reorders the group to reflect the new order of anticipated likelihood of selection of the characters in the group. The facility uses several different update approaches, described below, to determine whether a selection changes the order of anticipated likelihood of selection of the characters in a group. Under several of these approaches, after the user uses the facility to input the a-accent-aigu character, the a-accent-aigu character is considered to be the most likely character to be selected the next time a character is selected from its group. The facility therefore reorders the group, moving the a-accent-aigu character to the position immediately after the a character. The next time the user uses the facility to input an a-accent-aigu character, the a-accent-aigu character, and not the a-umlaut character, will be the first character in the group after the a character. The user will therefore only have to invoke the Replace function once to replace the a character with the target character, the a-accent-aigu character. This reflects the adaptive learning nature of the facility.

Figure 8:
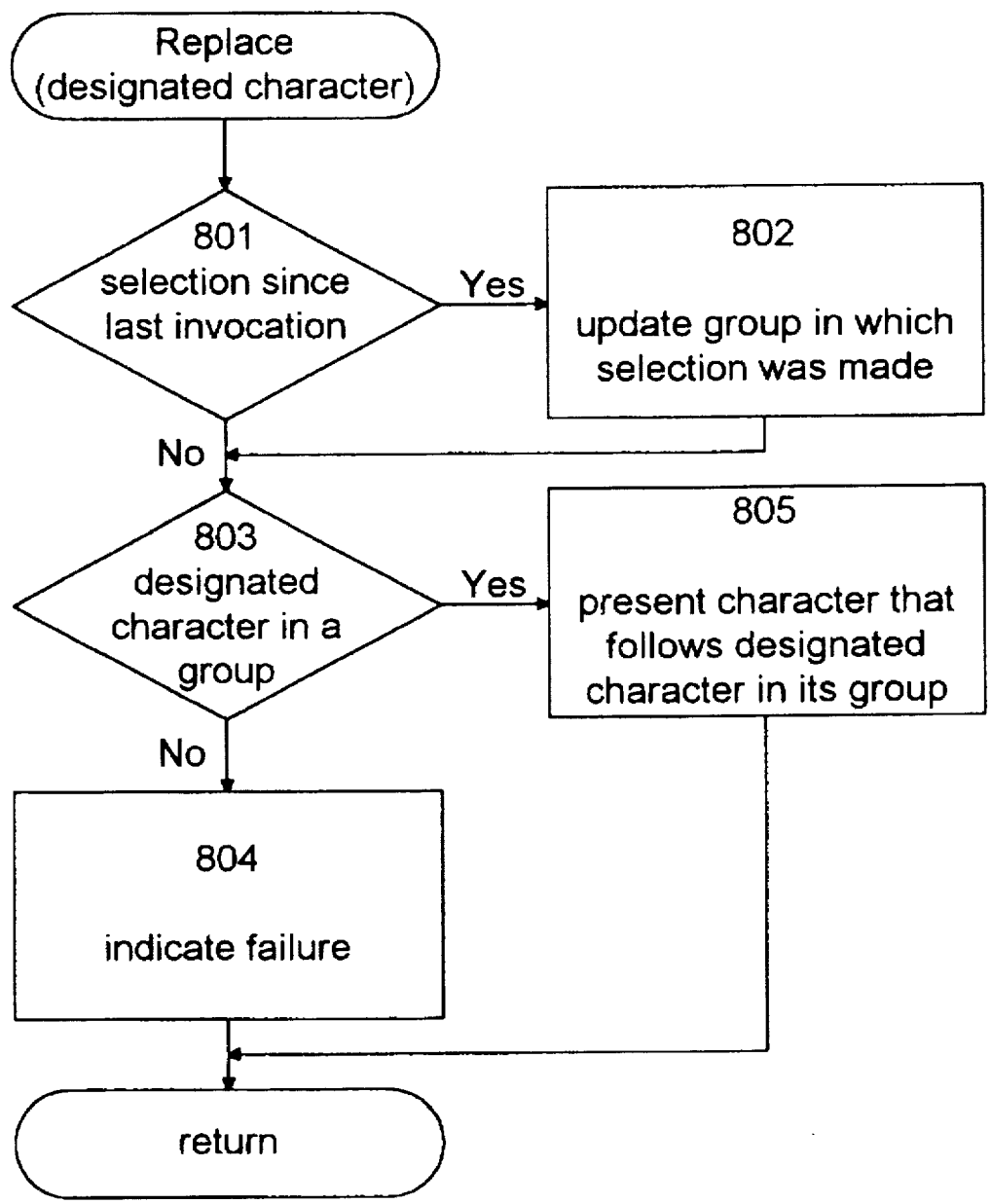
FIG. 8 is a flow diagram showing the steps required for the replace function in step 403.

FIG. 8 is a flow diagram showing the steps required for the replace function in step 403. These steps are carried out by the facility. The Replace function receives a designated character and, if the designated character is in a group, replaces the designated character with a character that follows the designated character in the group. In step 801, if the user has made a selection since the last invocation of the replace function, the facility continues at step 802, else the facility continues its step 803. In a preferred embodiment, the determination made in step 801 involves checking whether the position of the cursor has moved since the last invocation of the Replace function. The facility preferably stores the position of the cursor during each invocation of the replace function. The facility then compares the current location of the cursor to the stored location of the cursor from the last invocation of the Replace function. If the two cursor locations are different, then the user is deemed to have made a selection since the last invocation of the replace function and the facility continues its step 802. In an alternate preferred embodiment, the facility makes the determination in step 801 by storing the designated character during each invocation of the replace function and comparing the present designated character to the designated character stored during the last invocation of the replace function. If the designated characters are different, then the facility continues at step 802. In step 802, the facility updates the order of likelihood of selection of the characters in the group from which the selection was made. Step 802 is discussed in more detail below. After step 802, the facility continues at step 803. In step 803, if the designated character is in a group, then the facility continues its step 805, else the facility continues at step 804. In step 804, the facility provides the user with an indication that the replace function failed, such as an audible beep. These steps then conclude. In step 805, the facility presents the character that follows the designated character in the group that contains the designated character. Step 805 involves identifying the character to be presented by reading the group that contains the designated character, then inputting the character to be presented, causing its display on the display device. The facility identifies the character to be presented by locating the designated character in the group and identifying the character that follows the identified character in the group. In order to make the group circular, i.e., to permit the user to traverse the entire list multiple times, if desired, if the designated character is the last character of the group, then the facility identifies the first character of the group. In a preferred embodiment, this is accomplished by appending the first character of the group to the end of the group. This way, the first character in the group follows the second-to-last character in the group, completing the circularity of the group. The facility then returns success and these steps conclude.

Step 802 for updating the order of the group in which the last selection was made reorders the group if the last selection changes the order of anticipated likelihood of selection in the future. The facility provides three different approaches for performing step 802. The facility may order the group based upon the recency of the selection of each character in the group, the frequency of selection of each of the characters in the group, or so that if the selected character is the first member of a character pair (pair), then the second member of the same character pair becomes the first character in the group. Each of the approaches is described in detail below.

Figure 9:
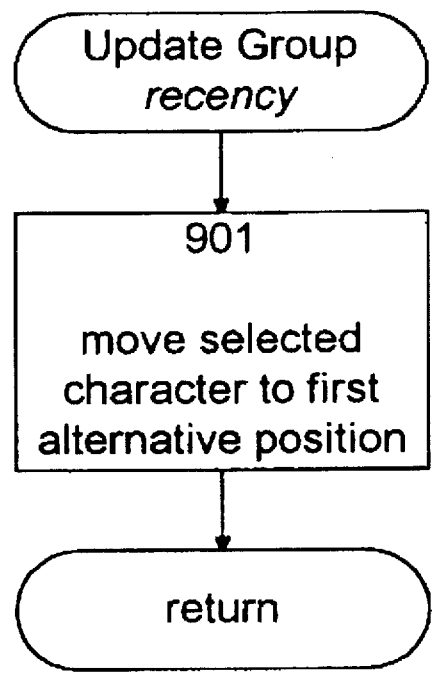
FIG. 9 is a flow diagram showing the steps required for the update group step 802 under the recency of selection approach.

FIG. 9 is a flow diagram showing the steps required for the update group step 802 under the recency of selection approach. Under the recency of selection approach, the last character selected from its group is considered to be the most likely character to be selected the next time a character is selected from its group. For example, if the a-accent-aigu character is the last character that was selected from its group, then the a-accent-aigu character is considered to be the most likely character to be selected the next time a character is selected from its group. In step 901, the facility moves the selected character from its present location in the group that contains it to the position immediately following the key character, shifting each of the other characters back one position. These steps then conclude.

Figure 10:
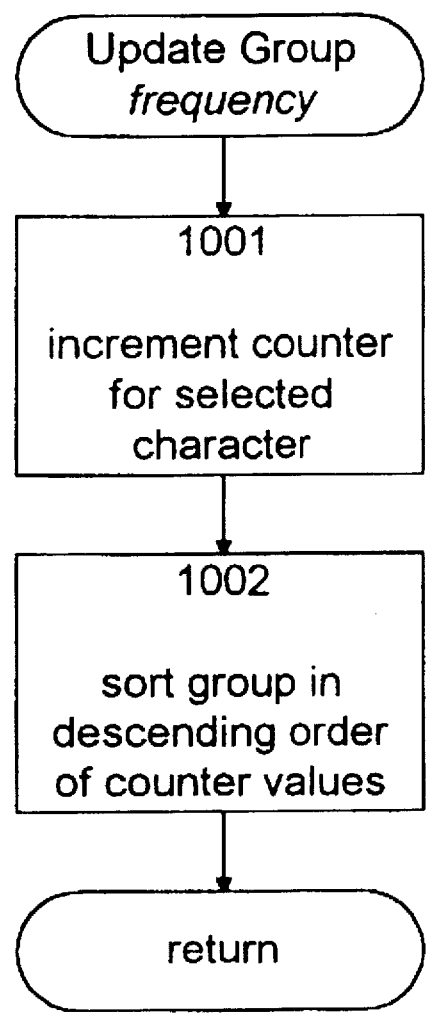
FIG. 10 is a flow diagram that shows the steps required for the update group step 802 under the frequency of selection approach.

FIG. 10 is a flow diagram that shows the steps required for the update group step 802 under the frequency of selection approach. Under the frequency of selection approach, the character most frequently selected from the group is considered most likely to be selected the next time a character is selected from the group. In step 1001, the facility increments the counter for the selected character. In step 1002, the facility sorts the group containing the selected character. For example, if the a-accent-aigu character has been selected more frequently than any of the other characters in its group, then the a-accent-aigu character is considered to be the most likely character to be selected the next time a character is selected from its group. Under this approach, the facility maintains a counter for each character in each group. The counters are preferably stored in arrays, each array corresponding to a group. If any counter grows to a value approaching the largest value that may be stored in the memory space allocated to a counter, the facility preferably reduces all the counter values for the group so that the counter values bear the same relationship to one another, but the largest one does not threaten the capacity of the space allocated for it.

Figure 11:
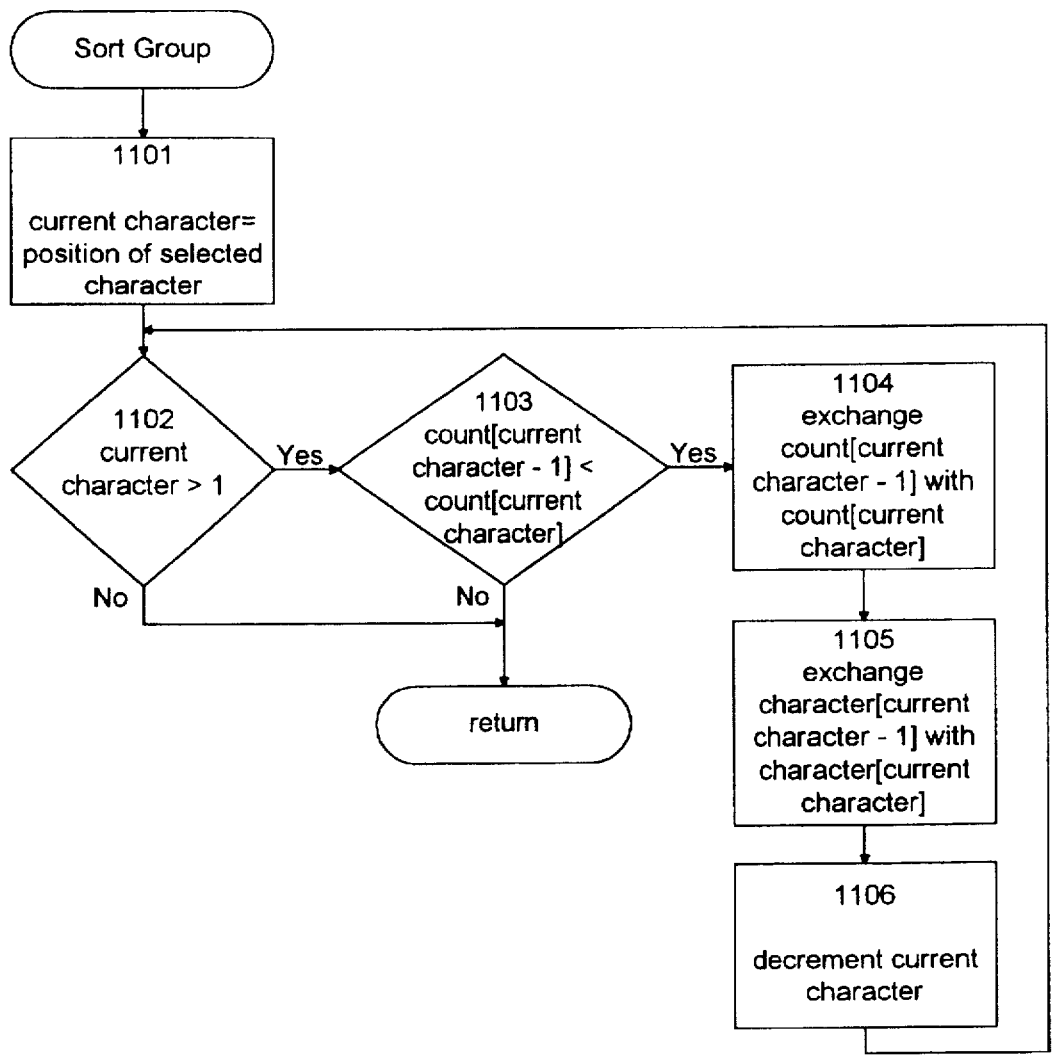
FIG. 11 is a flow diagram that shows the steps required for step 1002.

FIG. 11 is a flow diagram that shows the steps required for step 1002. In step 1101, a current character variable for maintaining position within the group while traversing it is set equal to the position of the select character in the group. For example, if the selected character is the fourth character in its group, the current character variable is set equal to four. In step 1102, if the current character is greater than one, then the facility continues at step 1103, else these steps conclude. In step 1103, if the counter value for the character in the position current character minus one is less than the counter value for the character in the position current character, then the facility continues its step 1104, else these steps conclude. In step 1104, the facility exchanges the counter value for the character in position current character minus one with the counter value for the character in position current character. Correspondingly, in step 1105, the facility exchanges the character and position current character minus one with the character and position current character. In step 1106, the facility decrements the value of the current character variable. The facility then continues at step 1102 to compare the next pair of counter values. Those skilled in the art will recognize that there are many other ways that the steps required for step 1002 could be implemented.

Figure 12:
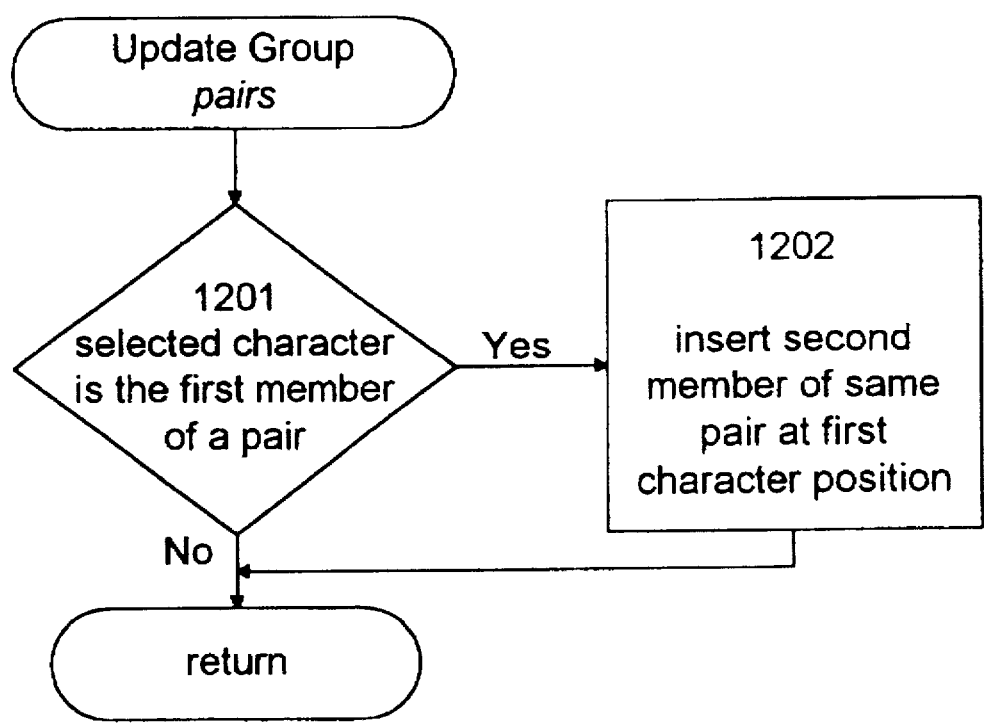
FIG. 12 is a flow diagram showing the steps required for the update group step 802 trader the character pairs approach.

FIG. 12 is a flow diagram showing the steps required for the update group step 802 under the character pairs approach. Under the character pairs approach, if the selected characters the first member of a pair of characters, then the second member of the same pair of characters is considered to be the most likely character to be selected the next time a character is selected from that group. For example, when the left brace character ("{") is selected, the right brace character ("}") is considered to be the most likely character to be selected the next time a character is selected from that group. In step 1201, if the selected character is the first member of a pair of characters, then the facility continues its step 1202, else these steps conclude. The determination of step 1201 requires the facility maintain a separate data structure for storing character pairs, such as a linked list of character pair structures, each containing a first member character and a second member character. For example, one character pair structure would have a left brace character as its first member and the right brace character as its second member. The facility determines whether the selected character is the first member of a pair by traversing the linked list in comparing the selected character to the first member of each character pair structure. In step 1202, the facility moves the second member of the character pair whose first member is the selected character to the beginning of the group containing the selected character. These steps then conclude.

All of the data structures associated with the facility are preferably maintained in a persistent manner, so that the optimized order of each group is not lost. The facility preferably stores these data structures on the storage device and retrieves them when they are needed by the facility. The data structures are preferably stored in a form in which they may be readily edited by the user, such as plain text. This permits the user to reorder or add characters to a group and add or delete a group. The user may also preferably elect among the approaches for updating a group. The user may preferably elect a single approach, or may elect to combine the character pairs approach with the frequency or recency approach. Also, in a preferred embodiment, the facility maintains a separate copy of its data structures for each user of the facility.

While this invention has been shown and described with reference to preferred embodiments, it will be understood by those skilled in the art that various changes or modifications in form and detail may be made without departing from the scope of the invention. Besides conventional characters, the facility may also be used to input other kinds of symbols or pictures that can somehow be related to key characters on the keyboard. Also, instead of a single character, each selection corresponds to a series of one or more characters. The facility may further be used to present menu items in decreasing order of likelihood of selection. The facility may also be used by non-human users, such as computer programs requesting services from an operating system.

We claim:

1. In a computer system having a display device and a keyboard with keys, a method for presenting alternative characters on the display device for selection by a user of the computer system comprising the computer implemented steps of:

associating a sequence of alternative characters with a predetermined key character, wherein the characters in the sequence are ordered in decreasing order of their likelihood of selection;

in response to a user selecting the predetermined key character, displaying the first character in the sequence on the display device; and in response to user input, invoking a replace function to replace the displayed character with the next character in the sequence until the target character in the sequence is displayed.

2. The method of claim 1 wherein the first character is a character in an alphabet of a first natural language and at least one of the alternative characters in the sequence is a character in an alphabet of a second natural language that differs from the first natural language.

3. The method of claim 1 wherein the computer system includes a storage device and wherein a record of the alternative characters previously selected by the user from the sequence is stored in the storage device.

4. The method of claim 3 wherein the characters are ordered in the sequence according to frequency of occurrence in the record of previously selected alternative characters such that the most frequently occurring character is the first character.

5. The method of claim 3 wherein the characters are ordered in the sequence according to recency of entrance in the record of previously selected alternative characters such that the most recently selected alternative character is the first character.

6. The method of claim 1, further comprising the steps of:

selecting the target character from among those characters in the sequence; and reordering the sequence of alternative characters in decreasing order of their likelihood of selection based on the selection of the target character.

7. The method of claim 1, further comprising the step of:

in response to a request by the user, changing at least one of the characters in the sequence to a new character.

8. The method of claim 1, further comprising the step of:

in response to a request by the user, associating a new sequence of characters with the predetermined key character such that one of the characters from the new sequence will be entered when the predetermined key character is selected.

9. The method of claim 1 wherein the predetermined key character is related to each character in the sequence of alterative characters by a common theme.

10. A computer-readable storage medium for use in a computer system having a display device and a keyboard having keys, the storage medium holding instructions for:

associating a sequence of alternative characters with a predetermined key character, wherein the characters in the sequence are ordered in decreasing order of their likelihood of selection;

in response to a user selecting the predetermined key character, displaying the first character in the sequence on the display device; and in response to user input, invoking a replace function to replace the displayed character with the next character in the sequence until the target character in the sequence is displayed.

11. In a computer system having an output device and a keyboard having keys, a method for presenting alternative characters on the display device for selection by a user of the computer system comprising the computer-implemented steps of:

outputting text that includes characters on the output device;

selecting one of the characters in the text in response to a user request, wherein the selected character is included in a predetermined sequence of alternative characters and wherein the sequence is ordered in decreasing order of their likelihood of selection; and in response to a user using the keyboard to request replacement of the selected character, replacing the selected character with the next character in the sequence of alternative characters until the target character is displayed.

12. The method of claim 11 wherein the selected character is a character of a first natural language and at least one of the alternative characters in the sequence is a character of a second natural language.

13. The method of claim 11 wherein the computer system includes a storage device and wherein a record of the alternative characters previously selected by the user from the sequence is stored in the storage device.

14. The method of claim 13 wherein the characters are ordered in the sequence according to frequency of occurrence in the record of previously selected alternative characters such that the most frequently occurring character is the first character.

15. The method of claim 13 wherein the characters are ordered in the sequence according to recency of entrance in the record of previously selected alternative characters such that the most recently selected character is the first character.

16. The method of claim 11 wherein the selected character is related to each character in the sequence of alternative characters by a common theme.

17. The method of claim 11, further comprising the step of reordering the sequence of alternative characters in decreasing order of their likelihood of selection based on the selection of the target character from the sequence of alternative characters.

18. A computer-readable storage medium for use in a computer system that has an output device that displays text that includes characters and a keyboard having keys, said medium holding instructions for:

outputting text that includes characters on the output device;

selecting one of the characters in the text in response to a user request, wherein the selected character is included in a predetermined sequence of alternative characters and wherein the sequence is ordered in decreasing order of their likelihood of selection; and in response to a user using the keyboard to request replacement of the selected character, replacing the selected character with the next character in the sequence of alternative characters until the target character is displayed.

19. A computer system comprising:

an output device for outputting characters;

a keyboard having keys for entering characters when a user depresses the keys; and a storage device on which is stored a character selection component for selecting which character in a sequence of alternative characters is displayed on the output device when a selected one of the keys is depressed, wherein the characters in the sequence are ordered in decreasing order of their likelihood of selection;

wherein said character selection component includes a replacement component for replacing the displayed character with the next character in the sequence until the target character in the sequence is displayed.

* * * * *